(12) United States Patent
Assenheimer

(10) Patent No.: US 6,604,758 B1
(45) Date of Patent: *Aug. 12, 2003

(54) HOSE COUPLING AND METHOD OF MANUFACTURE

(75) Inventor: Kevin C. Assenheimer, Bucyrus, OH (US)

(73) Assignee: Dayco Products, LLC, Miamisburg, OH (US)

( * ) Notice: Subject to any disclaimer, the term of this patent is extended or adjusted under 35 U.S.C. 154(b) by 46 days.

This patent is subject to a terminal disclaimer.

(21) Appl. No.: 09/654,495

(22) Filed: Sep. 1, 2000

Related U.S. Application Data

(63) Continuation-in-part of application No. 09/405,875, filed on Sep. 24, 1999.

(51) Int. Cl.[7] ............................................... F16L 11/00
(52) U.S. Cl. ........................ 285/115; 285/114; 285/256; 138/135
(58) Field of Search .............................. 285/115, 147.2, 285/239, 242, 244, 114, 318, 256; 138/110, 135, 136

(56) References Cited

U.S. PATENT DOCUMENTS

| | | | |
|---|---|---|---|
| 289,381 A | | 12/1883 | Bodifield |
| 739,097 A | * | 9/1903 | Marcy .......................... 285/114 |
| 790,971 A | | 5/1905 | Nicholis |
| 858,575 A | * | 7/1907 | Claflin ......................... 285/114 |
| 1,249,380 A | | 12/1917 | Goodall |
| 1,440,508 A | * | 1/1923 | Todd ....................... 138/135 X |
| 1,454,192 A | * | 5/1923 | Sturgis .................... 285/242 X |
| 1,510,761 A | * | 10/1924 | Burman ..................... 285/127.1 |
| 1,678,783 A | * | 7/1928 | Oakley ...................... 285/127.1 |
| 1,856,241 A | * | 5/1932 | Corley ...................... 285/127.1 |
| 1,974,383 A | * | 9/1934 | Wallace ....................... 138/135 |
| 2,066,473 A | | 1/1937 | Jorgensen |
| 2,166,448 A | * | 7/1939 | Schuknecht et al. .... 285/256 X |
| 2,300,057 A | | 10/1942 | Meyer |
| 2,640,502 A | * | 6/1953 | Powers ....................... 285/114 |
| 3,112,937 A | | 12/1963 | Williams |
| 3,333,871 A | | 8/1967 | Abbiati |
| 3,413,020 A | * | 11/1968 | Johns ..................... 285/256 X |
| 4,487,444 A | | 12/1984 | Hensen ........................ 285/144 |
| 5,036,890 A | * | 8/1991 | Whaley ....................... 138/110 |
| 5,246,254 A | * | 9/1993 | LoJacono, Jr. et al. . 285/114 X |
| 5,911,448 A | * | 6/1999 | Feher ....................... 285/256 X |
| 6,193,282 B1 | * | 2/2001 | Assenheimer ............... 285/115 |
| 6,227,579 B1 | * | 5/2001 | Humphreys ............. 285/239 X |

FOREIGN PATENT DOCUMENTS

| | | |
|---|---|---|
| AU | 203392 | 7/1955 |
| DE | 690748 | 5/1940 |
| FR | 1263653 | 5/1961 |

* cited by examiner

*Primary Examiner*—David Bochna
(74) *Attorney, Agent, or Firm*—Joseph V. Tassone

(57) ABSTRACT

An assembly of a flexible elastomeric fluid conveying hose which comprises a rigid coupling and a member extending partially into the hose body. A stress relief member, in the form of a helical spring, is mounted directly on the coupling member and also inserted into the body to prevent kinking or collapsing of the hose. The rigid coupling may also be of the swivel type of various configurations.

5 Claims, 4 Drawing Sheets

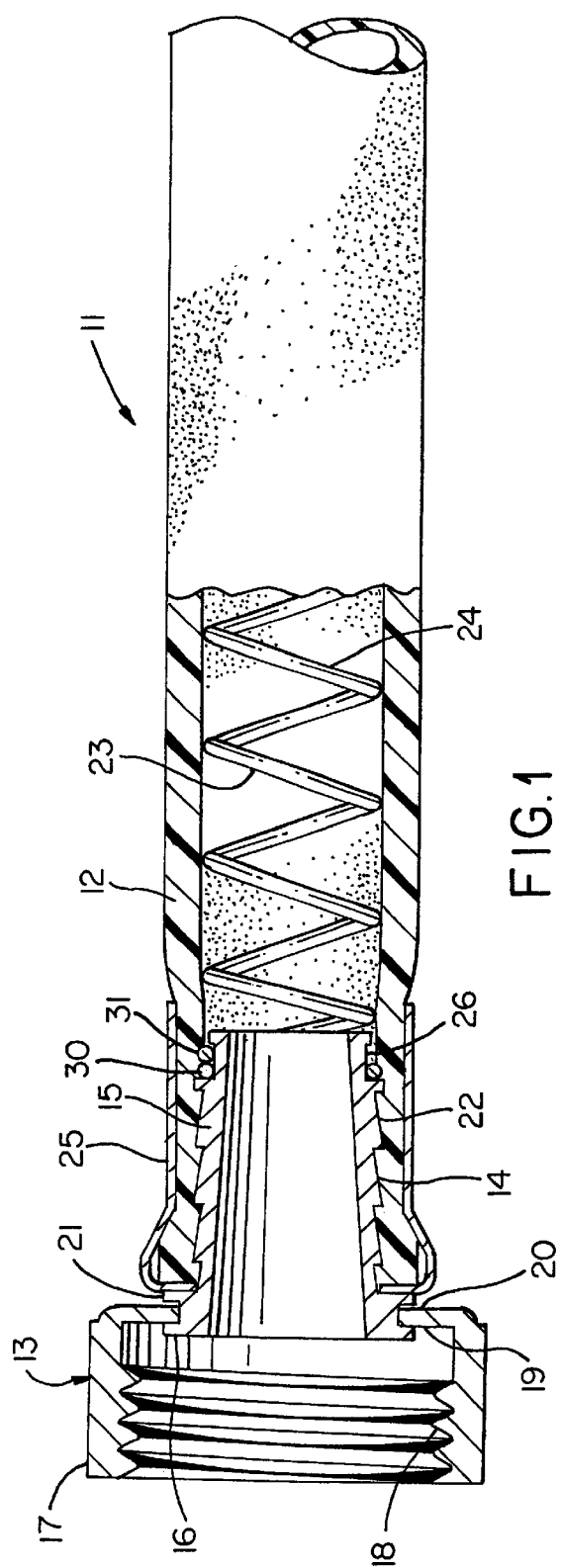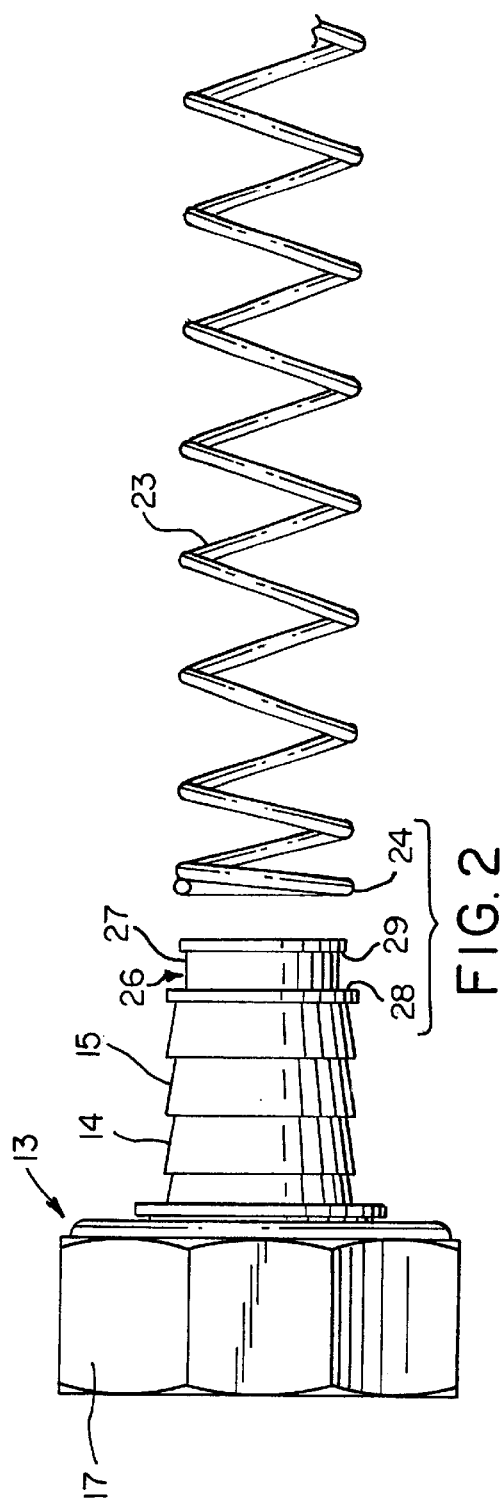

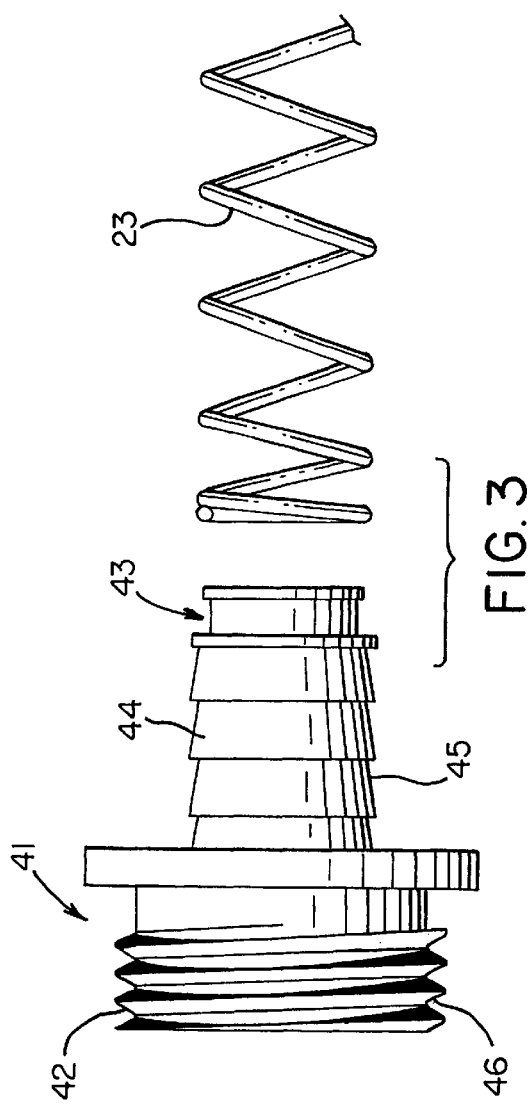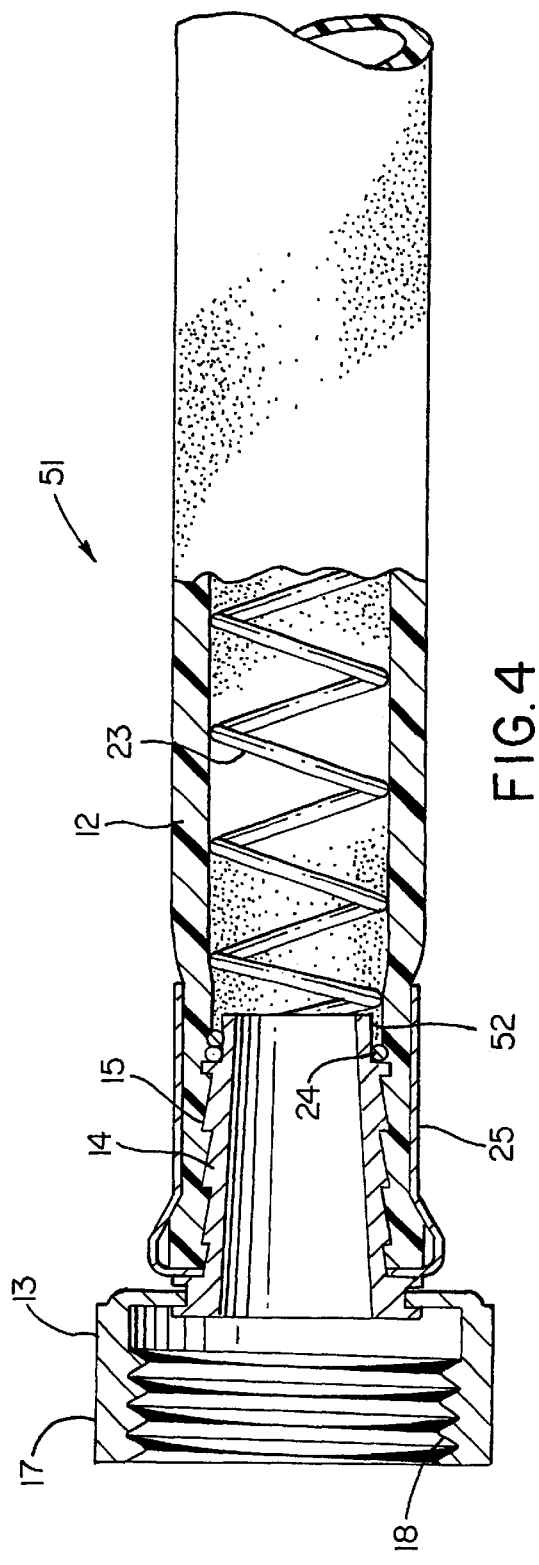

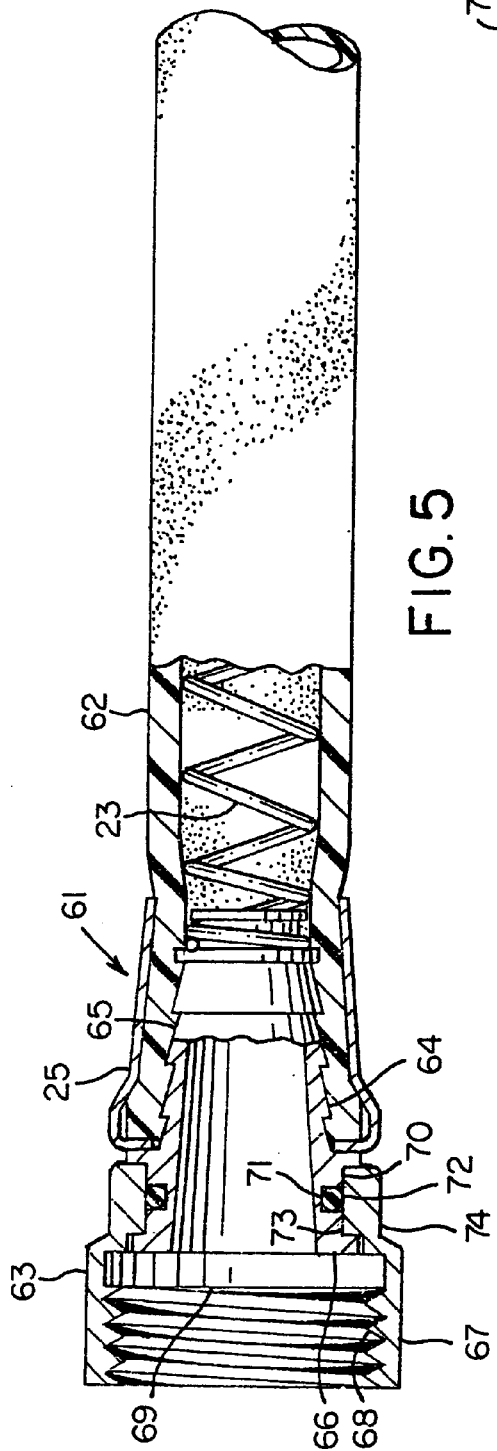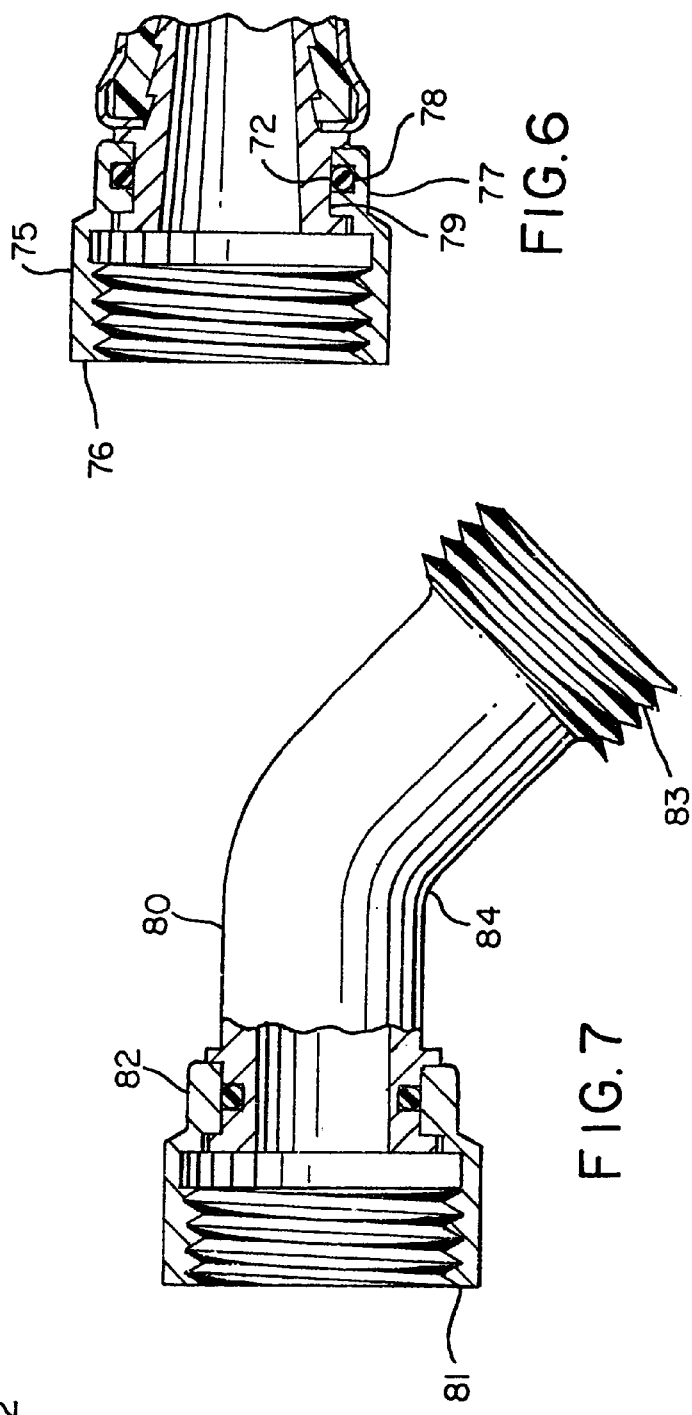

HOSE COUPLING AND METHOD OF MANUFACTURE

CROSS-REFERENCE TO RELATED APPLICATION

This application is a Continuation-in-Part of Ser. No. 09/405,875, filed Sep. 24, 1999.

BACKGROUND OF THE INVENTION

1. Field of the Invention

The present invention relates to a hose coupling for incorporation into a flexible elastomeric fluid conveying hose, such as a garden hose or air hose. The coupling is designed to reduce stress on the end of the hose and eliminate kinking during use.

2. Prior Art Statement

Various designs have been used for the stress relief on hose ends, including designs which utilize a spring mounted on a washer that is inserted into the hose coupling, as shown in the patent to Hensen, U.S. Pat. No. 4,487,444. U.S. Pat. No. 790,971 issued to Nicholls, utilizes a spring extending inside a hose and secured to the inner surfaces thereof.

SUMMARY OF THE INVENTION

According to the present invention, stress relief of the hose coupling is provided by a helical spring having a constant diameter throughout its length, the spring being mounted on and secured directly to the outer surface of the ferrule which is an integral component of the coupling. The spring extends into at least a portion of the hose body just beyond the end of the ferrule and thus eliminates the stress and kinking which occurs when the end is bent. By securing the end coils of the spring to the ferrule, the spring will be secured during bending so that it will not slip into the hose body, and yet provide flexibility during bending. Additional means is provided for compressing the outer surface of the hose against the end coils and into retaining means on the ferrule. The construction may be used on both the male and female ends of a fluid conveying hose, such as a garden hose, an air brake hose, or an industrial air hose.

It is a principal object of this invention therefor, to provide a hose coupling that will eliminate stress on the end of the hose.

It is a further object to prevent kinking and collapsing of the hose end when it is bent during use.

It is another object to provide a member that is secured to the ferrule of the hose coupling.

It is another object to provide means for compressing the hose around end coils of the spring onto the ferrule.

It is still another object to utilize a helical spring as the stress relief member and secure only the end coils thereof to the ferrule in a manner that will prevent it from becoming detached and retain its flexibility.

BRIEF DESCRIPTION OF THE DRAWINGS

FIG. 1 is a side view in partial section of a hose with the novel coupling.

FIG. 2 is an exploded view of the coupling and spring reinforcement.

FIG. 3 is a view similar to FIG. 2 of a different coupling and spring reinforcement.

FIG. 4 is a view similar to FIG. 1 illustrating a modified form of hose.

FIG. 5 is a view similar to FIG. 1 illustrating a swivel coupling.

FIG. 6 is a sectional side view illustrating a portion of a modified form of the coupling of FIG. 5.

FIG. 7 is a side view in partial section illustrating a coupling having a 45 degree angle.

DESCRIPTION OF PREFERRED EMBODIMENTS

Figure 8:
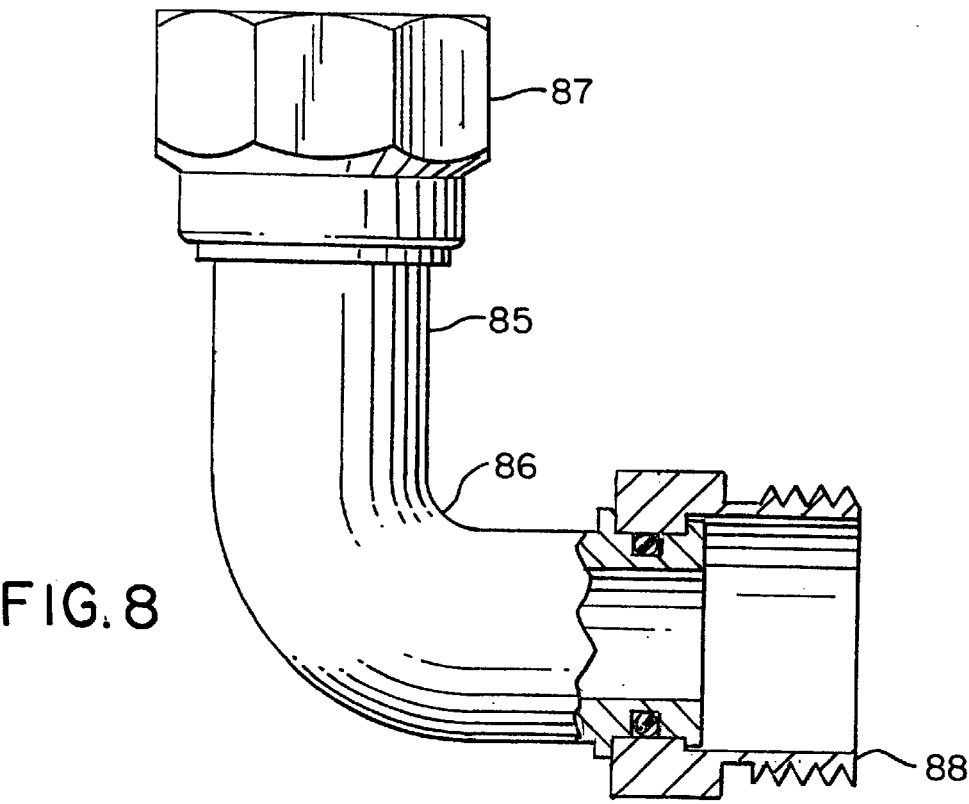
FIG. 8 is a side view in partial section illustrating a coupling having a 90 degree angle.

Referring to FIG. 1, reference numeral 11 illustrates a flexible hose having a hose body 12 made of an elastomeric material such as rubber, having smooth inner and outer annular surfaces. The hose shown is a garden hose conducting water for watering gardens, which is not reinforced, but other types of fluid conducting hoses, both reinforced and non-reinforced are contemplated as being within the scope of the present invention. Such hoses may conduct air, such as for air brakes or industrial uses. The hose 11 comprises a coupling 13, preferably made of a metal such as brass or steel, having a ferrule 14 which is a generally cylindrical member and consists of a tubular shaft 15 which terminates in an enlarged outer end 16. A collar 17 with internal threads 18 is freely rotatable, and acts as a female coupling to engage a mating male member, such as a hose faucet. The collar is secured to the ferrule by causing the surface 19 to engage the outer end 16 while surface 20 engages a spaced ring member 21 of the ferrule. The shaft 15 has spaced annular rings 22. The stress relief member is a helical spring 23 having spaced coils 24 which are of a constant diameter throughout the length of the spring. The coils may have a circular cross-section as shown, or may be a so-called "flat spring", meaning that the coils are rectangular in cross-section. The spring coils may be made of metal or plastic, as is well known in the art. One or more of the end coils are mounted on and retained by the outer surface of the shaft 15 of the ferrule by various methods known in the art, such as crimping. The coupling assembly is inserted into the hose body 12 so that the shaft 15 and the spring 23 extend into the hose body and crimped into place by an outer rigid sleeve 25 which compresses the hose body around the end coils 30 and 31 of the spring, and thus into the groove 26 formed in the shaft. It is only necessary to retain one or two of the end coils 30 and 31 in the groove to secure the coils, yet provide a sufficient flexibility of the spring. The spring extends just beyond the inner end of the ferrule in a direction away from the hose end, and is preferably between 4 and 7 times in length compared to the length of the ferrule 14, in order to obtain the best results.

FIG. 2 is an exploded view which illustrates a preferred means for retaining one or more coils of the spring on the hose coupling, showing in greater detail the shaft 15 of ferrule 14 with a single groove 26 extending into and around the outer surface of the shaft. As shown, the groove has a rectangular cross-section with the shaft of the ferrule forming a base 27, and side walls 28 and 29 extending at right angles thereto. However, this groove may have other shapes or may be replaced by indicia such as color markings. One or more coils 24 of the spring 23 are snapped into this groove for locking them into place. This arrangement may be used as the sole retaining means for the coils, or may be used to supplement the crimping of the coils referred to above. Any of these arrangements are important because they prevent the spring from slipping down into the hose body and thus causing the spring to lose its effectiveness in stress or strain relief.

FIG. 3 is an exploded view of a hose coupling 41 which is constructed like coupling 13 except that instead of having a rotatable female collar it has a fixed male collar 42 with external threads 43 designed to engage a member similar to collar 17 which may be found, for example, on a hose nozzle. The end coils 24 are secured to the outer surface of the shaft 15 in the same manner as in coupling 13 by placing them in groove 43 in a manner similar to the arrangement described above, and the shaft 44 of ferrule 45 and retained spring are similarly inserted in the hose body.

FIG. 4 is a view similar to FIG. 1 which illustrates a hose 51 identical to hose 11 except that instead of the groove 26 at the end of the ferrule 54, the end 52 of the shaft 53 is straight. This illustrates the earlier-referred to concept of retaining the spring without the use of the groove to secure the end coils of the spring. Instead, the crimping may secure these end coils to the end 52 by use of the pressure exerted radially inward by the crimping mechanism.

In addition to the assemblies shown above, it is also contemplated to utilize the invention on swivel type couplings. Such couplings are well known and manufactured, for example, by Tompkins Industries, Inc., whose catalog is appended to this application. The principal difference between a swivel coupling and a conventional coupling such as shown in FIGS. 1–4, lies in the construction of the ferrule. In the conventional coupling the end collar 17 is attached to a fluid source, such as a hose faucet, and tightened to provide locking and sealing attachment to the faucet. This locks the collar to the ferrule. In a swivel coupling of the type to be described below, the coupling is freely rotatable with respect to the faucet and the hose even while retaining the sealing and locking attachment.

FIG. 5 illustrates a hose assembly 61 comprising hose 62 which is similar to hose 11, described above. The coupling 63 is made of metal and has a ferrule 64 of a generally cylindrical configuration, with a tubular shaft 65 extending into the interior of the hose. The other end of the ferrule terminates in an enlarged outer end 66. A collar 67, having internal threads 68, is mounted on end 66, and acts as a female end which serves as means for attaching to a fluid source member, such as a hose faucet. The collar, similar to collar 17, is tightened to the faucet and thus locks and provides a seal thereto. The collar is secured to the ferrule by engaging its inner surface 69 against outer end 66. The outer surface 70 of the ferrule has a groove 71 extending around its periphery, into which an O-ring 72 is placed, the surface end O-ring contacting the inner surface 73 of an extension ring 74 of the collar. It is this structure which allows the free rotation, or swivel feature, of the coupling. The shaft 65 of the ferrule is similar to shaft 15 described above. The helical spring 23, identical to the one shown in FIGS. 1–4 is mounted on the outer surface of the shaft in the same manner as described above, and the rigid outer sleeve 25 also functions in the previously described manner.

FIG. 6 illustrates a partial view of a coupling 75 which is identical to coupling 63 except that it describes an alternative method and structure for placement of the O-ring 72. In this modification, the collar 76 is similar to collar 67 except that the inward extension ring 77 contains the groove 78 into which the O-ring is inserted and which bears against the surface 79 of the ferrule. This structure provides the same results as the structure in FIG. 5.

FIG. 7 demonstrates the versatility of the invention, and illustrates a coupling 80 having a body with a forty-five degree bend designated by reference number 84. The coupling is preferably made of metal, like coupling 13, but may be made of a rigid, tough plastic material such as ABS or polycarbonate. The collar 81, which is coupled to the fluid outlet, is attached to the ferrule 82 on the same manner as the coupling 63 shown in FIG. 5, and provides the same swivel feature. The opposite end 83 is a male fitting and is adapted to be attached to a female collar of a hose; the coupling thus provides a change in direction between the hose and faucet. If so desired, the coupling may be made an integral part of the hose, eliminating the male end 83.

FIG. 8 illustrates a coupling 85 having a body with a ninety degree bend designated by reference number 86, intended for use in a manner similar to FIG. 7, and made of the same material as coupling 80. A collar 87 at one end of the coupling is adapted for coupling to the fluid source, such as a hose faucet. The collar may be attached to a ferrule in the manner shown in FIGS. 1–4, or it may be a swivel coupling as shown in FIGS. 5–7 and attached to the ferrule accordingly. The other end fitting 88 of the coupling, which is at right angles to the first end, is a male coupling for attachment to a corresponding female hose end. As shown, this end has the necessary structure to serve as a swivel coupling so that it performs this function regardless of whether collar end 87 has the swivel feature. As in the coupling 80 of FIG. 7, the swivel feature may be eliminated and this end will then be connectable to the hose without the swivel, but retaining the advantage of the right angle shape. Or also as in coupling 80, the end 88 may be made an integral part of the hose.

Figure 9:
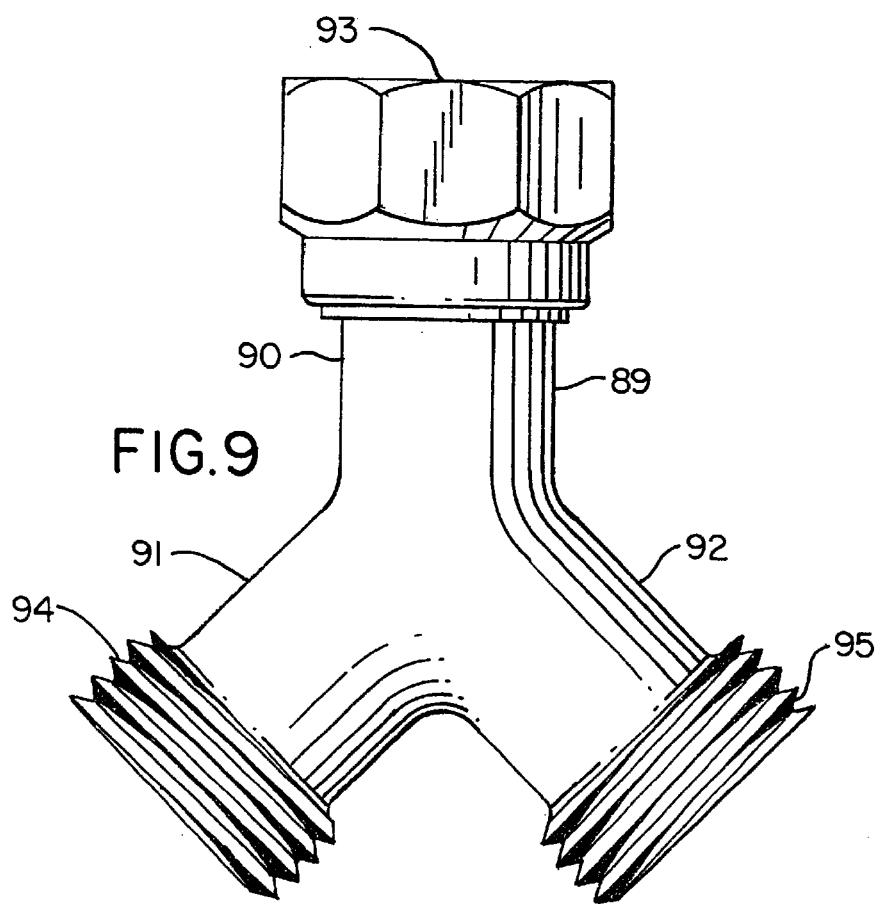
FIG. 9 is a side view illustrating a bifurcated coupling having a "Y" connection.

FIG. 9 illustrates a coupling 89 which is bifurcated to form a "Y" configuration, and consists of a single leg 90 which branches into two legs 91 and 92. The single leg terminates in a collar 93, and has the same structural arrangement as collars 67, 76, 81 and 87; that is, the swivel feature resulting from the manner in which the collar is mounted on the ferrule. This is also made of the same material as the other couplings. The collar 93, which is coupled to the fluid outlet, is attached to its adjacent ferrule in the same manner as coupling 63 of FIG. 5, and is also a swivel coupling. The legs 91 and 92 terminate in male fittings 94 and 95 for coupling to a female collar of a hose, thus permitting the fluid to be directed into two passages. It is also contemplated that either or both of the fittings 94 and 95 may have a female collar end such as provided by collar 81 and ferrule 82 of FIG. 7. Alternatively, these fittings may be of the construction as fitting 88 of FIG. 8, to provide a swivel attachment to the hose.

It should be noted that the couplings shown above are primarily designed for garden hose, but if the inventive concept is to be utilized for air hose, air brake hose, hydraulic hose, or the like, necessary modifications are contemplated to accommodate these systems.

The above embodiments are merely exemplary, and other embodiments are contemplated as being within the spirit of the invention.

What is claimed is:

1. A termination for an elastomeric hose, said termination comprising a threaded collar configured for engagement with a fluid supply nozzle, and coupling apparatus securing said collar to a terminated end of said hose, characterized in that said coupling apparatus comprises:

(a) a generally cylindrical ferrule engaging said collar and free to swivel relative thereto, said ferrule extending from said collar to a position inside said terminated end of said hose, the surface of said ferrule being provided with an annularly extending groove of generally rectangular crossection, (b) a stress relieving spring situated inside said hose, said stress relieving spring extending helically from a position inside said terminated end to a position engaging said ferrule and thence circularly within said groove, and (c) a rigid sleeve crimped against said terminated end of said hose, so as to confine at least one full coil of said stress relieving spring securely within said groove.

2. A termination according to claim 1 characterized in that said rigid sleeve confines at least two full coils of said stress relieving spring within said groove.

3. A termination for an elastomeric hose, said termination comprising a threaded collar configured for engagement with a fluid supply nozzle, and coupling apparatus securing said collar to a terminated end of said hose, characterized in that said coupling apparatus comprises:

(a) a generally cylindrical ferrule engaging said collar and free to swivel relative thereto, said ferrule extending from said collar to a position inside said terminated end of said hose, the surface of said ferrule being provided with an annularly extending groove of generally rectangular crossection (b) a stress relieving spring situated inside said hose, said stress relieving spring extending helically from a position inside said terminated end to a position engaging said ferrule and thence circularly within said groove, (c) a rigid sleeve crimped against said terminated end of said hose, so as to confine at least one full coil of said stress relieving spring securely within said groove, and (d) A fluid seal between said collar and said ferrule.

4. A termination according to claim 3 characterized in that said fluid seal comprises an O-ring.

5. A termination according to claim 3 characterized in that said rigid sleeve confines at least two full coils of said stress relieving spring within said groove.

* * * * *